United States Patent
Hoffmann et al.

(10) Patent No.: US 6,921,209 B2
(45) Date of Patent: Jul. 26, 2005

(54) CONICAL HYDRODYNAMIC PIVOT BEARING

(75) Inventors: Joerg Hoffmann, Mettlach (DE); Martin Hafen, Spaichingen (DE); Olaf Winterhalter, Epfendorf (DE)

(73) Assignee: Minebea Co., Ltd., Nagano (JP)

( * ) Notice: Subject to any disclaimer, the term of this patent is extended or adjusted under 35 U.S.C. 154(b) by 88 days.

(21) Appl. No.: 10/388,731

(22) Filed: Mar. 12, 2003

(65) Prior Publication Data

US 2003/0198413 A1 Oct. 23, 2003

Related U.S. Application Data

(60) Provisional application No. 60/363,784, filed on Mar. 12, 2002.

(30) Foreign Application Priority Data

Aug. 29, 2002 (DE) .......................... 102 39 886

(51) Int. Cl.[7] ............................... F16C 32/06
(52) U.S. Cl. ........................ 384/110; 384/109
(58) Field of Search .............. 384/100, 107, 384/110, 112, 450, 243, 244, 245, 246, 108, 109

(56) References Cited

U.S. PATENT DOCUMENTS

| 4,043,612 | A | * | 8/1977 | Orcutt ....................... 384/110 |
|---|---|---|---|---|
| 4,346,946 | A | | 8/1982 | Maruyama |
| 4,547,081 | A | * | 10/1985 | Tanaka et al. ............. 384/107 |
| 4,720,198 | A | * | 1/1988 | DeBruyn ................... 384/246 |
| 4,934,836 | A | | 6/1990 | Tanaka et al. |
| 5,598,048 | A | * | 1/1997 | Dunfield et al. .......... 310/90.5 |
| 5,667,309 | A | | 9/1997 | Nose |
| 5,855,437 | A | * | 1/1999 | Lee .......................... 384/110 |
| 5,947,608 | A | | 9/1999 | Kim |
| 6,020,664 | A | * | 2/2000 | Liu et al. ...................... 310/90 |
| 6,069,768 | A | * | 5/2000 | Heine et al. ............ 360/99.08 |
| 6,127,756 | A | * | 10/2000 | Iwaki et al. ................. 310/90 |
| 6,371,650 | B1 | | 4/2002 | Goto et al. |
| 6,406,185 | B1 | * | 6/2002 | Lin ............................. 384/246 |
| 6,520,476 | B1 | * | 2/2003 | Chuang ...................... 248/694 |

FOREIGN PATENT DOCUMENTS

| DE | 2815009 | 10/1979 |
|---|---|---|
| JP | 07071448 | 3/1995 |

* cited by examiner

Primary Examiner—Thomas R. Hannon
(74) Attorney, Agent, or Firm—Joel Lutzker; Anna Vishev; Schulte Roth & Zabel

(57) ABSTRACT

A bearing having a conical hydrodynamic bearing section and a pivot bearing section. The bearing can be used with a spindle motor. The conical hydrodynamic bearing section is formed by the conical portion of the shaft and a correspondingly shaped cavity of the bearing sleeve. The pivot bearing section is located adjacently to the conical bearing section and is formed by the curved end face of the shaft and an endplate inserted into the cavity of the bearing sleeve.

13 Claims, 3 Drawing Sheets

CONICAL HYDRODYNAMIC PIVOT BEARING

CROSS-REFERENCE TO RELATED APPLICATIONS

This application claims priority from Fed. Rep. Of Germany Patent Application No. DE10239886.0, filed on Aug. 29, 2002, and from U.S. Provisional Patent Application Ser. No. 60/363,784, filed on Mar. 12, 2002.

BACKGROUND OF THE INVENTION

The following invention relates to electronic spindle motors of the type used in disk drives and in particular relates to improvements in fluid bearings for such motors.

Disc drive systems have been used in computers and other electronic devices for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

Electric spindle motors of the type used in disk drives conventionally rely on ball bearings to support a rotary member, such as a rotating hub, on a stationary member, such as a shaft. Ball bearings are wear parts and in time friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat and noise, both of which are undesirable in a disk drive motor.

Fluid dynamic bearings represent a considerable improvement over conventional ball bearings in spindle drive motors. In these types of systems, lubricating fluid—either gas or liquid—functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems.

SUMMARY OF THE INVENTION

It is an object of the present invention to provide a spindle motor with a fluid dynamic pivot bearing which saves run-current and, therefore, reduces power consumption of the spindle motor. The present inventions combines the benefit of increased stability provided by hydrodynamic bearings with the benefit of low power consumption provided by pivot bearings.

The present invention provides these benefits by providing a fluid dynamic conical bearing with a pivot bearing for use in a spindle motor. The fluid dynamic conical bearing resists both horizontal motion of the shaft and upward motion of the shaft, while the pivot bearing resists downward motion of the shaft.

The above and other objects, aspects, features and advantages of the invention will be more readily apparent from the description of the preferred embodiments thereof taken in conjunction with the accompanying drawings.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments.

Figure 1:
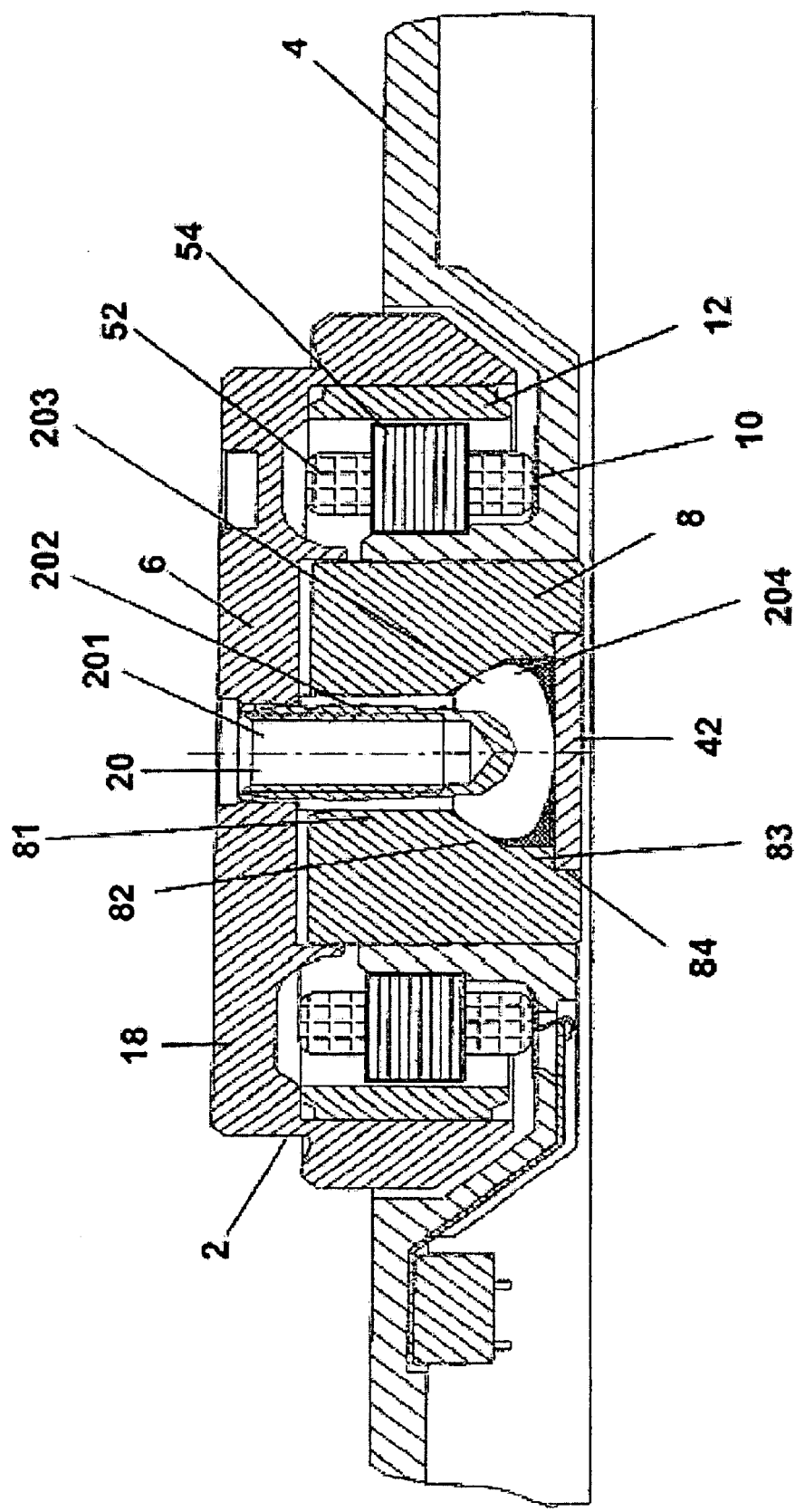
FIG. 1 is a side cut-away view of an electronic spindle motor having a rotational shaft, a fluid dynamic conical bearing, and a pivot bearing according to the first embodiment of the present invention.

The first embodiment of the present invention is shown in FIG. 1. A Spindle motor 2 includes a bracket 4 which is to be mounted on a disk drive device (not shown). A rotor 6 is arranged for rotation relative to bracket 4. A sleeve 8 and a stator 10 are fixedly mounted on bracket 4.

Rotor 6 comprises a rotor hub 18 and a tubular shaft 20 fixed coaxially to rotor hub 18. A rotor magnet 12 is bonded to the inner side of a circumferential wall of rotor hub 18. The outer side of the circumferential wall of the rotor hub 18 is shaped to hold a magnetic disk (not shown).

Stator 10 comprises a core 52 fixedly fitted to bracket 4 and coils 54 wound on the core 52. The stator 10 is radially spaced by a small gap from and arranged opposite to the rotor magnet 12.

Sleeve 8 is a tubular member comprising four sections that are distinguished from each other based upon their inner radii. First sleeve section 81 has a constant inner radius A, except that, the inner radius of first sleeve section 81 increases slightly near the top surface of sleeve 8 to form a capillary seal. Second sleeve section 82 has an inner radius that increases linearly as the depth of the sleeve 8 increases so as to form a frustum shaped conic section. The inner radius of second sleeve section 82 can be described by the following equation: $r_{sl2}=A+mY$, where $r_{sl2}$ is the inner radius of second sleeve section 82, A is the inner radius of first sleeve section 81, m is the rate of increase (slope) of the radius of second sleeve section 82, and Y is the vertical distance below first sleeve section 81. Third sleeve section 83 has a constant inner radius B that is equal to the maximum radius of second sleeve section 82. Fourth sleeve section 84 has a constant inner radius C that is greater than the inner radius of third sleeve section 83. End plate 42 is fit into fourth sleeve section 84 of Sleeve 8.

Shaft 20 is also comprised of four sections. First shaft section 201 fits inside of and is rigidly connected to hub 18. Second shaft section 202 fits inside of first sleeve section 81, although second shaft section 202 extends slightly below first sleeve section 202. Second shaft section 202 has a constant radius F that is slightly less than the radius A of first sleeve section 81. Third shaft section 203 extends below second shaft section 202 and it fits within second sleeve section 82. The radius of third shaft section 203 is less than the radius of second sleeve section 82. However, the radius of third shaft section 203 increases faster than the rate of increase of the radius of second sleeve section 82 until approximately the mid point of second sleeve section 82, after which the radius of third shaft section 203 increases slower than the rate of increase of the radius of second sleeve section 82. Hence, the distance between second sleeve section 82 and third shaft section 203 reaches a minimum at approximately the mid point of second sleeve section 82. Fourth shaft section 204 extends below third shaft section 203 and it begins at approximately the same height as third sleeve section 83. The radius of fourth shaft section 204 decreases rapidly and it goes to zero at the bottom of third sleeve section 83 at which point fourth shaft section 204 touches end plate 42.

The radius of third shaft section 203 can be described by the following equation: $r_{s3}=D+f_{s3}(Z)$, where $r_{s3}$ is the radius of third shaft section 203, D is the radius of second shaft section 202, Z is the vertical distance below second shaft section 202, and $f_{s3}(Z)$ is a constantly increasing function of Z. The derivative of $f_{s3}(Z)$ with respect to Z, which is equal to the derivative of the radius of third shaft section 203 with respect to Z, is always positive ($df_{s3}(Z)/dZ=dr_{s3}/dZ>0$). Additionally, in the first embodiment, the second derivative of $f_{s3}(Z)$ with respect to Z is always negative ($d^2f_{s3}(Z)/d^2Z=d^2r_{s3}/d^2Z<0$) and it is a continuous function.

The distance between second sleeve section 82 and third shaft section 203 is at its minimum when the rate of increase of the radius of third shaft section 203 as a function of the vertical distance below second shaft section 202 (the derivative of $f_{s3}(Z)$ with respect to Z) is equal to the rate of increase of the radius of second sleeve section 82 ($r_{s/2}-r_{s3}$ is a minimum when $df_{s3}(Z)/dZ=m$). Bearing stiffness can be adjusted by varying the derivative of the rate of increase of the radius of third shaft section 203. The closer that $d^2f_{s3}(Z)/d^2Z$ is to zero the stiffer the bearing will be, provided that the minimum distance between third shaft section 203 and second sleeve section 82 remains constant. However, such increased stiffness results in greater energy losses.

The gap comprised of the spaces between sleeve 8, end plate 42 and shaft 20 is filled with an appropriate lubricating fluid. Pressure generating grooves are formed either onto the surface of second sleeve section 82 or onto the surface of third shaft section 203 to create a conical bearing. The grooves are formed such that they are centered approximately at the point where the distance between second sleeve section 82 and third shaft section 203 is a minimum ($df_{s3}(Z)/dZ=m$). Hence, the maximum pressure is generated at that point.

Forth shaft section 204, end plate 42, and third sleeve section 203 form a pivot bearing. Downward motion of the rotor is resisted by the physical contact of shaft 20 and end plate 42. Additionally, the conical bearing provides stabilization of the rotor in the horizontal plane and it also resists upward motion of the rotor. Hence, thrust bearings and journal bearings are generally not required for this embodiment of the invention. However, one or two journal bearings may be added to this embodiment by forming pressure generating grooves onto the surface of either first sleeve section 81 or second shaft section 202, if additional horizontal stabilization is required. Additionally, pressure generating grooves can be placed on the bottom of the fourth shaft section 204 or on the top of the end plate 42 to minimize material contact between the shaft 20 and the end plate 42.

This first embodiment can be modified to allow for a fixed shaft rotating hub arrangement. In such an arrangement, shaft 20 is press-fit into the end plate 42 and sleeve 8 is affixed to the hub 18.

Figure 2:
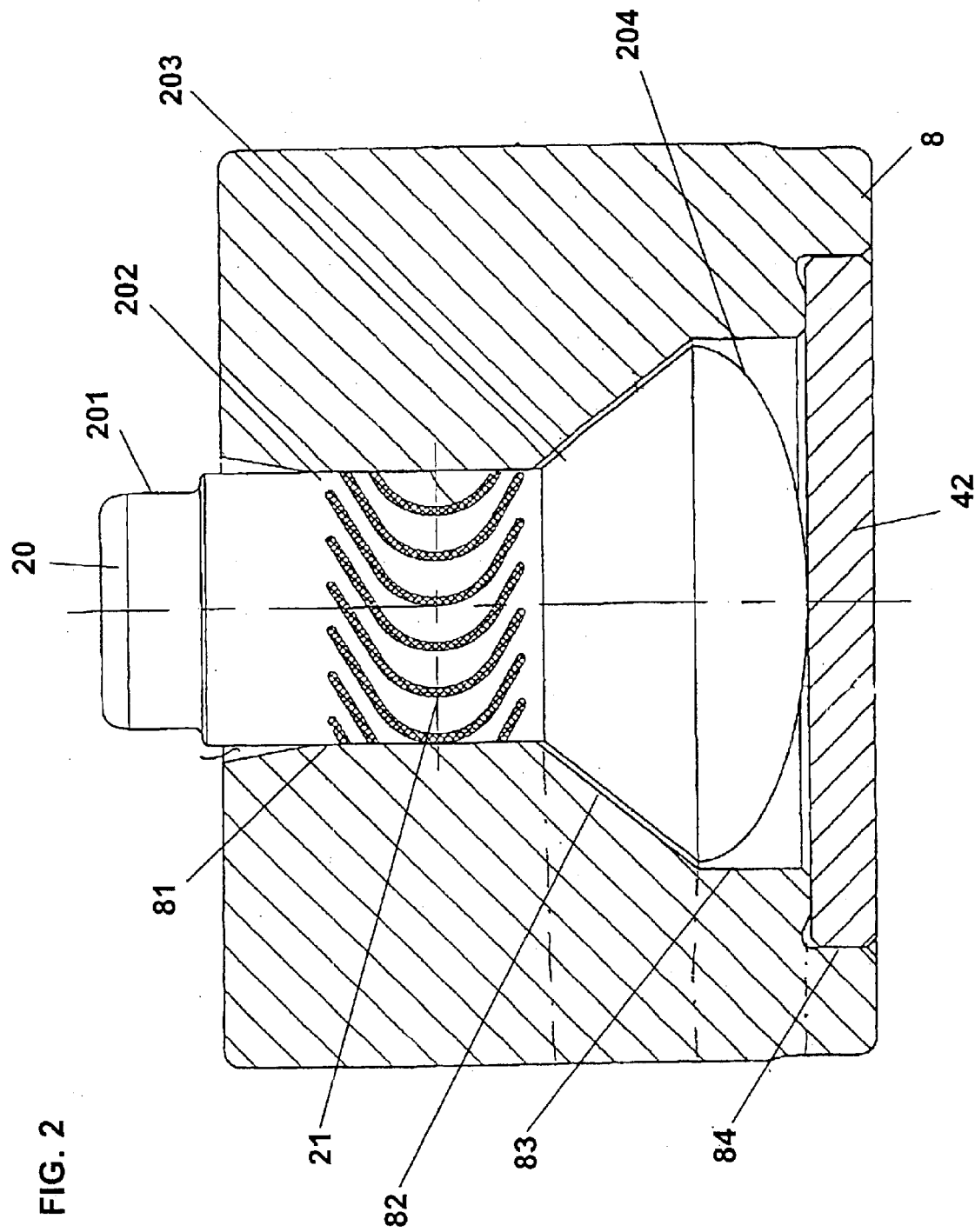
FIG. 2 is a side cut-away view of a bearing according to the second embodiment of the present invention.

The second embodiment of the present invention is shown in FIG. 2. FIG. 2 shows the bearing portion of a spindle motor. It is comprised of sleeve 8, shaft 20, and end plate 42.

As shown in FIG. 2, sleeve 8 is a tubular member comprising four sections that are distinguished from each other based upon their inner radii. First sleeve section 81 has a constant inner radius A, except that the inner radius of first sleeve section 81 increases slightly near the top surface of sleeve 8 to form a capillary seal. Second sleeve section 82 has an inner radius that increases linearly as the depth of the sleeve 8 increases so as to form a conic section. The inner radius of second sleeve section 82 can be described by the following equation: $r_{S/2}=A+mY$, where $r_{S/2}$ is the inner radius of second sleeve section 82, A is the inner radius of first sleeve section 81, m is the rate of increase (slope) of the radius of second sleeve section 82, and Y is the vertical distance below first sleeve section 81. Third sleeve section 83 has a constant inner radius B that is equal to the maximum radius of second sleeve section 82. Fourth sleeve section 84 has a constant inner radius C that is greater than the inner radius of third sleeve section 83. End plate 42 is fit into fourth sleeve section 84 of Sleeve 8.

As shown in FIG. 2, shaft 20 is also comprised of four sections. First shaft section 201 fits inside of and is rigidly connected to hub 18. Second shaft section 202 fits inside of first sleeve section 81, although second shaft section 202 extends slightly below first sleeve section 202. Second shaft section 202 has a constant radius F that is slightly less than the radius A of first sleeve section 81. Third shaft section 203 extends below second shaft section 202 and it fits within second sleeve section 82. The radius of third shaft section 203 is less than the radius of second sleeve section 82 by a constant amount. Hence, the distance between second sleeve section 82 and third shaft section 203 is constant over the entire length of third shaft section 203. Fourth shaft section 204 extends below third shaft section 203 and it begins at approximately the same height as third sleeve section 83. The radius of fourth shaft section 204 decreases rapidly and it goes to zero at the bottom of third sleeve section 83 at which point fourth shaft section 204 touches end plate 42.

The radius of third shaft section 203 can be described by the following equation: $r_{s3}=D+f_{s3}(Z)$, where $r_{s3}$ is the radius of third shaft section 203, D is the radius of second shaft section 202, Z is the vertical distance below second shaft section 202, and $f_{s3}(Z)$ is a constantly increasing function of Z. The derivative of $f_{s3}(Z)$ with respect to Z, which is equal to the derivative of the radius of third shaft section 203 with respect to Z, is a constant positive value ($df_{s3}(Z)/dZ=dr_{s3}/dZ>0$). Additionally, in the second embodiment, the second derivative of $f_{s3}(Z)$ with respect to Z is always zero ($d^2f_{s3}(Z)/d^2Z=d^2r_{s3}/d^2Z=0$).

The gap comprised of the spaces between sleeve 8, end plate 42 and shaft 20 is filled with an appropriate lubricating fluid. Pressure generating grooves are formed on the surface of second sleeve section 82 or onto the surface of third shaft section 203 to create a conical bearing. Fourth shaft section 204, end plate 42, and third sleeve section 83 form a pivot bearing. In the second embodiment, the conical bearing provides stabilization to the rotor in the horizontal plane and it also resists upward motion of the rotor. Downward motion of the rotor is resisted by the pivot bearing. Hence, thrust bearings and journal bearings are generally not required for this embodiment of the invention. However, as shown on FIG. 2, pressure generating grooves 21 are included on second shaft section 202 to form a journal bearing and provide additional horizontal stabilization. Additionally, pressure generating grooves may be placed on the bottom of the fourth shaft section 204 or on the top of the end plate 42 to minimize material contact between the shaft 20 and the end plate 42.

The primary difference between embodiment 2 and the bearing of embodiment 1 is that the derivative of the rate of increase of the radius of third shaft section 203 with respect to the vertical distance below second shaft section 202 is equal to zero ($d^2f_{s3}(Z)/d^2Z=d^2r_{s3}/d^2Z=0$), which is the limiting case from embodiment 1.

Figure 3:
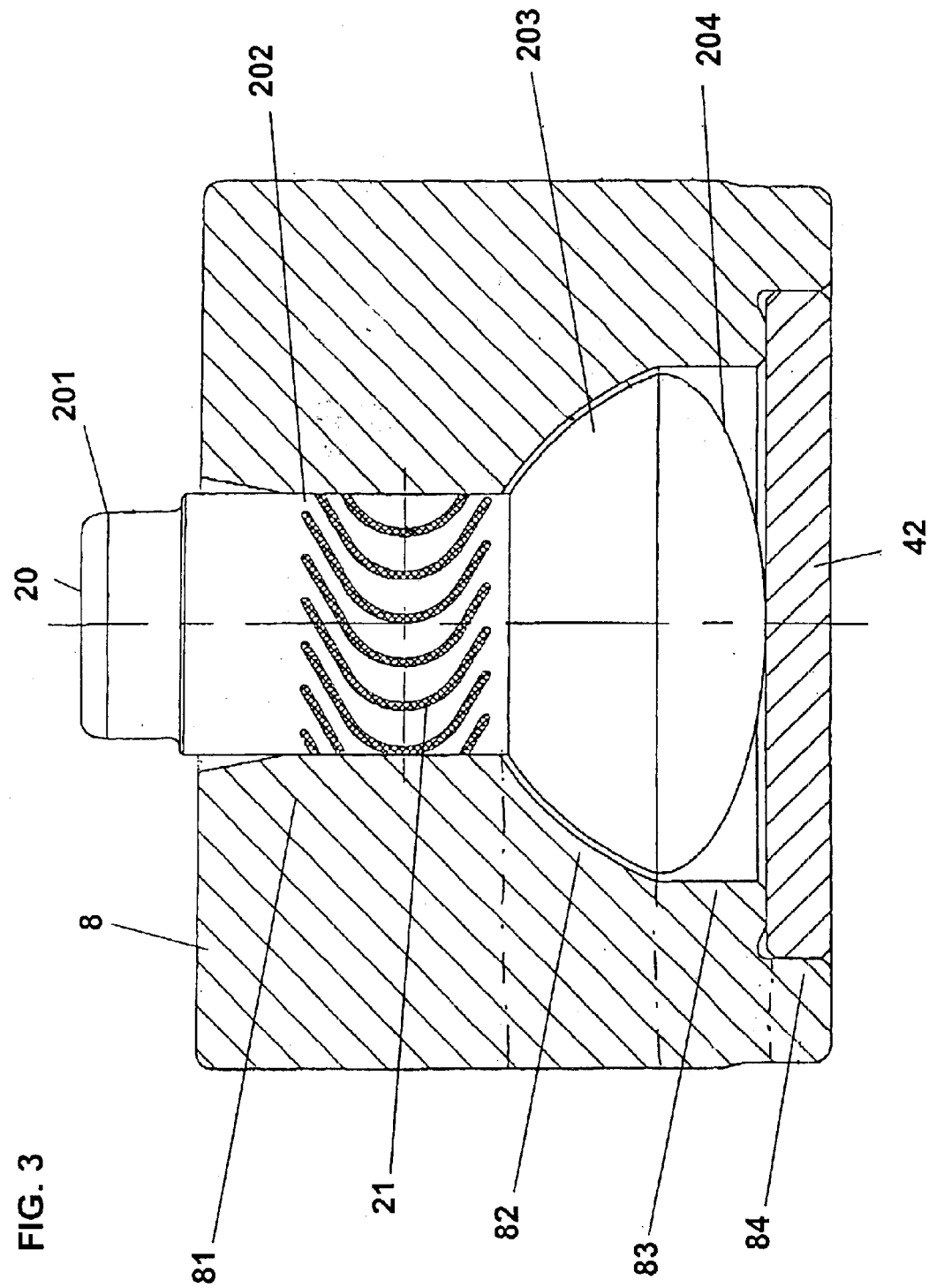
FIG. 3 is a side cut-away view of a bearing according to the third embodiment of the present invention.

The third embodiment of the present invention is shown in FIG. 3. FIG. 3 shows the bearing portion of a spindle motor. It is comprised of sleeve 8, shaft 20, and end plate 42.

As shown in FIG. 3, sleeve 8 is a tubular member comprising four sections that are distinguished from each other based upon their inner radii. First sleeve section 81 has a constant inner radius A, except that the inner radius of first sleeve section 81 increases slightly near the top surface of sleeve 8 to form a capillary seal. Second sleeve section 82 has an inner radius that increases as the depth of sleeve 8 increases. However, the rate of increase of the inner radius of second sleeve section 82 decreases as the depth of sleeve 8 increases. Third sleeve section 83 has a constant inner radius B that is equal to the maximum radius of second sleeve section 82. Fourth sleeve section 84 has a constant inner radius C that is greater than the inner radius of third sleeve section 83. End plate 42 is fit into fourth sleeve section 84 of Sleeve 8.

The inner radius of second sleeve section 82 can be described by the following equation: $r_{sl2}=D+f_{sl2}(Y)$, where $r_{Sl2}$ is the radius of second sleeve section 82, D is the radius of first sleeve section 81, Y is the vertical distance below first sleeve section 81, and $f_{sl2}(Y)$ is a constantly increasing function of Y. The derivative of $f_{s3}(Y)$ with respect to Y, which is equal to the derivative of the radius of second sleeve section 82 with respect to Y, is always positive ($df_{sl2}(Y)/dY=dr_{sl2}/dY>0$). Additionally, in the third embodiment, the second derivative of $f_{sl2}(Y)$ with respect to Y is always negative ($d^2f_{s3}(Z)/d^2Z=d^2r_{s3}/d^2Z<0$) and it is a continuous function.

As shown in FIG. 3, shaft 20 is also comprised of four sections. First shaft section 201 fits inside of and is rigidly connected to hub 18. Second shaft section 202 fits inside of first sleeve section 81, although second shaft section 202 extends slightly below first sleeve section 202. Second shaft section 202 has a constant radius F that is slightly less than the radius A of first sleeve section 81. Third shaft section 203 extends below second shaft section 202 and it fits within second sleeve section 82. The radius of third shaft section 203 increases as the depth of third shaft section 203 increases. However, the rate of increase of the radius of third shaft section 203 decreases as the depth of third shaft section 203 increases. The radius of third shaft section 203 is less than the radius of second sleeve section 82 by a constant amount for the entire length of third shaft section 203. Fourth shaft section 204 extends below third shaft section 203 and it begins at approximately the same height as third sleeve section 83. The radius of fourth shaft section 204 decreases rapidly and it goes to zero at the bottom of third sleeve section 83 at which point fourth shaft section 204 touches end plate 42.

The radius of third shaft section 203 can be described by the following equation: $r_{s3}=D+f_{s3}(Z)$, where $r_{s3}$ is the radius of third shaft section 203, D is the radius of second shaft section 202, Z is the vertical distance below second shaft section 202, and $f_{s3}(Z)$ is a constantly increasing function of Z. The derivative of $f_{s3}(Z)$ with respect to Z, which is equal to the derivative of the radius of third shaft section 203 with respect to Z, is always positive ($df_{s3}(Z)/dZ=dr_{s3}/dZ>0$). Additionally, in the first embodiment, the second derivative of $f_{s3}(Z)$ with respect to Z is always negative ($d^2f_{s3}(Z)/d^2Z=d^2r_{s3}/d^2Z<0$) and it is a continuous function.

In the third embodiment, the gap comprised of the spaces between sleeve 8, end plate 42 and shaft 20 is filled with an appropriate lubricating fluid. Pressure generating grooves are formed either onto the surface of second sleeve section 82 or onto the surface of third shaft section 203 to create a conical bearing. The conical bearing provides stabilization to the rotor in the horizontal plane and it also resists upward motion of the rotor. The placement of the grooves determines the relative strength of the horizontal stabilization and the upward stabilization (the thrust and journal components of the conical bearing). A higher placement of the grooves results in relatively greater resistance to upward movement of the shaft, while a lower placement of the grooves results in relatively greater horizontal stabilization. Additionally, fourth shaft section 204, end plate 42, and third sleeve section 83 form a pivot bearing, which resists downward motion of the shaft by the physical contact of shaft 20 with end plate 42. Hence, thrust bearings and journal bearings are generally not required for this embodiment of the invention. However, as shown on FIG. 3, pressure generating grooves 21 are included on second shaft section 202 to form a journal bearing and to provide additional horizontal stabilization. Additionally, pressure generating grooves can be placed on the bottom of the fourth shaft section 204 or on the top of the end plate 42 to minimize material contact between the shaft 20 and the end plate 42.

What is claimed is:

1. A bearing comprising:
   a sleeve having a first section, a second section and a third section, said sections of said sleeve forming a cavity within said sleeve, said second section of said sleeve extending from said first section of the sleeve to said third section of the sleeve,
   a shaft having a first section, a second section, a third section and a fourth section, said third section of said shaft extending from said second section of the shaft to said fourth section of the shaft; and
   a fluid;
   wherein
   said shaft extends into said cavity within said sleeve, and a gap exists between said shaft and said sleeve;
   said fluid is contained in said gap;
   said second section of said sleeve has a length extending from said first section of said sleeve, and it has an inner radius perpendicular to said length that increases as a function of a distance measured along said length from said first section of said sleeve;
   said third section of said shaft has a length extending from said second section of said shaft, and it has a radius perpendicular to said length that increases as a function of a distance measured along the length from said second section of said shaft;
   said third section of said shaft is positioned inside said second section of said sleeve;
   pressure generating grooves are formed on one of said second section of said sleeve and said third section of said shaft;
   said fourth section of said shaft has a length extending from said third section of said shaft and it has a radius perpendicular to said length that decreases as a function of a distance measured along the length from said third section of said shaft until said radius of said fourth section of said shaft reaches zero at the end of said length;
   the fourth section of said shaft is positioned inside said third section of said sleeve.

2. A bearing according to claim 1 wherein:
   said shaft rotates.

3. A bearing according to claim 1 wherein:
   said sleeve rotates.

4. A bearing according to claim 1
   wherein said sleeve further comprises a fourth section located adjacently to said third section of said sleeve;
   wherein an end plate is inserted into said fourth section of said sleeve;
   wherein said fourth section of said sleeve is contiguous with said third section of said sleeve and forms an opening at the bottom end of said cavity within said sleeve;

said endplate seals said opening; and
said shaft rotates on said endplate.

5. A bearing according to claim 1 wherein:
the inner radius of said second section of said sleeve has a value and it is described by the following equation:

$$r_{sl1} = A + mY$$

where $r_{sl1}$ is the inner radius of said second section of said sleeve at a particular point along its length;

A is the minimum value of the inner radius of said second section of said sleeve;

m is a constant positive value, and

Y is a distance measured from a lower end of said first section of said sleeve to said particular point.

6. A bearing according to claim 5 wherein:
the radius of the third section of said shaft has a value and it is described by the equation:

$$r_{sh1} = D + f(Z); \text{ where}$$

$r_{sh1}$ is the radius of the third section of shaft at a particular point along its length;

D is the minimum value of the radius of the third section of said shaft;

Z is a distance measured from a lower end of said second section of said shaft to said particular point;

f(Z) is a function of Z with a minimum value of zero;

the derivative of f(Z) with respect to Z is always positive; and the second derivative of f(Z) with respect to Z is always negative.

7. A bearing according to claim 1 wherein:
the distance between the radius of said third section of said shaft and the inner radius of said second section of said sleeve is constant over the entire length of said third section of said shaft.

8. A bearing according to claim 7 wherein:
the inner radius of said second section of said sleeve has a value and it is described by the following equation:

$$r_{sl1} + A = mY$$

where $r_{sl1}$ is the inner radius of said second section of said sleeve at a particular point along its length;

A is the minimum value of the inner radius of said second section of said sleeve;

m is a constant positive value, and

Y is a distance measured from a lower end of said first section of said sleeve to said particular point.

9. A bearing according to claim 7 wherein:
the radius of the third section of said shaft has a value and it is described by the equation:

$$r_{sh1} = D + f(Z); \text{ where}$$

$r_{sh1}$ is the radius of the third section of said shaft at a particular point along its length;

D is the minimum value of the radius of the third section of said shaft;

Z is a distance measured from a lower end of said second section of said shaft to said particular point;

f(Z) is a function of Z with a minimum value of zero;

the derivative of f(Z) with respect to Z is always positive; and the second derivative of f(Z) with respect to Z is always negative.

10. A bearing for a spindle motor comprising:
a shaft having an end portion, said end portion further comprising a conical section and a convex section;

a bearing sleeve having a cavity that surrounds the shaft at a small radial distance; and an endplate inserted into an opening in said cavity and affixed to the bearing sleeve;

wherein a pivot bearing is provided between the endplate and the convex section of the end portion of the shaft; and a portion of said cavity is shaped in a complimentary fashion to said conical section of said end portion of said shaft.

11. A hydrodynamic bearing, comprising:
a shaft further comprising a conical bearing portion and a pivot bearing portion having a curved surface and located adjacently to said conical bearing portion;

a bearing sleeve having an internal cavity accommodating said shaft, said internal cavity further comprising a conical cavity portion corresponding in shape to said conical bearing portion of said shaft;

an endplate enclosing said internal cavity of said bearing sleeve; and a plurality of dynamic pressure-generating grooves formed on one of an outer surface of said conical bearing portion of said shall and an inner surface of said conical cavity portion of said bearing sleeve, wherein a conical hydrodynamic bearing is formed between said outer surface of said conical bearing portion and said inner surface of said conical cavity portion, and wherein a hydrodynamic pivot bearing is formed between said curved surface of said pivot bearing portion and said endplate.

12. A bearing according to claim 11 further comprising:
a fluid dynamic journal bearing.

13. A hydrodynamic bearing comprising:
a conical hydrodynamic bearing section formed by a conical portion of a shaft and a correspondingly shaped portion of a cavity of a bearing sleeve; and a pivot bearing section located adjacently to the conical bearing section and formed by a curved end face of the shaft and an endplate inserted into a bottom portion of the cavity of the bearing sleeve.

* * * * *